US011758449B2

United States Patent
Wu et al.

(10) Patent No.: US 11,758,449 B2
(45) Date of Patent: Sep. 12, 2023

(54) HANDOVER REQUESTS WITH NETWORK INFORMATION

(71) Applicant: LENOVO (BEIJING) LIMITED, Beijing (CN)

(72) Inventors: Lianhai Wu, Beijing (CN); Haiming Wang, Beijing (CN); Jing Han, Beijing (CN); Jie Shi, Beijing (CN); Zhennian Sun, Beijing (CN); Xiaodong Yu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 347 days.

(21) Appl. No.: 17/276,401

(22) PCT Filed: Oct. 9, 2018

(86) PCT No.: PCT/CN2018/109487
§ 371 (c)(1),
(2) Date: Mar. 15, 2021

(87) PCT Pub. No.: WO2020/073196
PCT Pub. Date: Apr. 16, 2020

(65) Prior Publication Data
US 2022/0078680 A1  Mar. 10, 2022

(51) Int. Cl.
*H04W 36/00* (2009.01)
(52) U.S. Cl.
CPC .............................. *H04W 36/0083* (2013.01)
(58) Field of Classification Search
CPC ............. H04W 36/08; H04W 36/0055; H04W 36/0033; H04W 36/0016; H04W 36/0044; H04W 36/00837; H04W 36/00835; H04W 36/0085; H04W 36/0079; H04W 36/26; H04W 36/22; H04W 36/30; H04W 36/0072; H04W 36/0083
See application file for complete search history.

(56) References Cited

U.S. PATENT DOCUMENTS 9,253,704 B1 * 2/2016 Sarkar ................. H04W 36/305
9,398,508 B1   7/2016 Velusamy et al.
(Continued)

FOREIGN PATENT DOCUMENTS

CN   102387606 A   3/2012
CN   102752821 A   10/2012

OTHER PUBLICATIONS

International Searching Authority, "Notification of Transmittal of the International Search Report and the Written Opinion of the International Searching Authority, or the Declaration", PCT/CN2018/109487, dated Oct. 9, 2018, pp. 1-6.

*Primary Examiner* — Allahyar Kasraian
(74) *Attorney, Agent, or Firm* — Kunzler Bean & Adamson

(57) ABSTRACT

Apparatuses, methods, and systems are disclosed for transmitting and/or receiving handover requests with network information. One method (1000) includes transmitting (1002) a handover request to a target device. The handover request includes: first information indicating that a source communication network corresponding to a source device is unable to support a predetermined quality of service; and second information corresponding to capacity of the source communication network. The method (1000) includes receiving (1004) a response to the handover request.

20 Claims, 11 Drawing Sheets

(56) References Cited

U.S. PATENT DOCUMENTS

| | | |
|---|---|---|
| 10,405,247 B2 * | 9/2019 | Fu ................... H04W 36/0085 |
| 2012/0270552 A1 | 10/2012 | Shi et al. |
| 2014/0211757 A1 * | 7/2014 | Pereira ............ H04W 36/0069 370/331 |
| 2015/0382252 A1 * | 12/2015 | Yu ................... H04W 36/0058 370/331 |
| 2018/0124650 A1 | 5/2018 | Park et al. |
| 2018/0124656 A1 | 5/2018 | Park et al. |
| 2019/0230681 A1 * | 7/2019 | Han ..................... H04W 24/10 |

\* cited by examiner

HANDOVER REQUESTS WITH NETWORK INFORMATION

FIELD

The subject matter disclosed herein relates generally to wireless communications and more particularly relates to handover requests with network information.

BACKGROUND

The following abbreviations are herewith defined, at least some of which are referred to within the following description: Third Generation Partnership Project ("3GPP"), Acknowledge Mode ("AM"), Backhaul ("BH"), Broadcast Multicast ("BM"), Buffer Occupancy ("BO"), Base Station ("BS"), Bandwidth Part ("BWP"), Component Carrier ("CC"), Coordinated Multipoint ("CoMP"), Control Plane ("CP"), CSI-RS Resource Indicator ("CRI"), Channel State Information ("CSI"), Channel Quality Indicator ("CQI"), Central Unit ("CU"), Codeword ("CW"), Downlink ("DL"), Demodulation Reference Signal ("DMRS"), Data Radio Bearer ("DRB"), Distributed Unit ("DU"), Enhanced Mobile Broadband ("eMBB"), Evolved Node B ("eNB"), Enhanced Subscriber Identification Module ("eSIM"), Enhanced ("E"), Frequency Division Duplex ("FDD"), Frequency Division Multiple Access ("FDMA"), Frequency Range ("FR"), Hybrid Automatic Repeat Request ("HARQ"), Integrated Access Backhaul ("IAB"), Identity or Identifier or Identification ("ID"), Information Element ("IE"), Interference Measurement ("IM"), International Mobile Subscriber Identity ("IMSI"), Internet-of-Things ("IoT"), Internet Protocol ("IP"), Joint Transmission ("JT"), Level 1 ("L1"), Logical Channel ("LCH"), Logical Channel Prioritization ("LCP"), Long Term Evolution ("LTE"), Multiple Input Multiple Output ("MIMO"), Mobile-Termination ("MT"), Machine Type Communication ("MTC"), Multi-User MIMO ("MU-MIMO"), Negative-Acknowledgment ("NACK") or ("NAK"), Next Generation ("NG"), Next Generation Node B ("gNB"), New Radio ("NR"), Non-Zero Power ("NZP"), Orthogonal Frequency Division Multiplexing ("OFDM"), Peak-to-Average Power Ratio ("PAPR"), Physical Broadcast Channel ("PBCH"), Physical Downlink Shared Channel ("PDSCH"), Policy Control Function ("PCF"), Packet Data Convergence Protocol ("PDCP"), Packet Data Network ("PDN"), Protocol Data Unit ("PDU"), Public Land Mobile Network ("PLMN"), Precoding Matrix Indicator ("PMI"), Packet Switched ("PS"), Primary Synchronization Signal ("PSS"), Quasi Co-Located ("QCL"), Quality of Service ("QoS"), Radio Access Network ("RAN"), Radio Access Technology ("RAT"), Resource Element ("RE"), Rank Indicator ("RI"), Radio Link Failure ("RLF"), Radio Resource Control ("RRC"), Reference Signal ("RS"), Reference Signal Received Power ("RSRP"), Reference Signal Received Quality ("RSRQ"), Receive ("RX"), Secondary Cell ("SCell"), Service Data Unit ("SDU"), Subscriber Identity Module ("SIM"), Signal-to-Interference and Noise Ratio ("SINR"), Sequence Number ("SN"), Synchronization Signal ("SS"), SS/PBCH Block ("SSB"), Secondary Synchronization Signal ("SSS"), Time Division Multiplexing ("TDM"), Temporary Mobile Subscriber Identity ("TMSI"), Transmission Reception Point ("TRP"), Transmit ("TX"), User Entity/Equipment (Mobile Terminal) ("UE"), Universal Integrated Circuit Card ("UICC"), Uplink ("UL"), Unacknowledged Mode ("UM"), Universal Mobile Telecommunications System ("UMTS"), User Plane ("UP"), Universal Subscriber Identity Module ("USIM"), Universal Terrestrial Radio Access Network ("UTRAN"), Voice Over IP ("VoIP"), Visited Public Land Mobile Network ("VPLMN"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, handover requests may be used. In such networks, a handover request may supply limited information.

BRIEF SUMMARY

Methods for transmitting handover requests with network information are disclosed. Apparatuses and systems also perform the functions of the apparatus. In one embodiment, the method includes transmitting a handover request to a target device. In such an embodiment, the handover request includes: first information indicating that a source communication network corresponding to a source device is unable to support a predetermined quality of service; and second information corresponding to capacity of the source communication network. In certain embodiments, the method includes receiving a response to the handover request.

An apparatus for transmitting handover requests with network information, in one embodiment, includes a transmitter that transmits a handover request to a target device. In such an embodiment, the handover request includes: first information indicating that a source communication network corresponding to a source device is unable to support a predetermined quality of service; and second information corresponding to capacity of the source communication network. In various embodiments, the apparatus includes a receiver that receives a response to the handover request.

One method for receiving handover requests with network information includes receiving, at a target device, a handover request from a source device. In such embodiments, the handover request includes: first information indicating that a source communication network corresponding to the source device is unable to support a predetermined quality of service; and second information corresponding to capacity of the source communication network. In some embodiments, the method includes transmitting a response to the handover request.

An apparatus for receiving handover requests with network information, in one embodiment, includes a receiver that receives a handover request at the apparatus from a source device. In such an embodiment, the handover request includes: first information indicating that a source communication network corresponding to the source device is unable to support a predetermined quality of service; and second information corresponding to capacity of the source communication network. In various embodiments, the apparatus includes a transmitter that transmits a response to the handover request.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
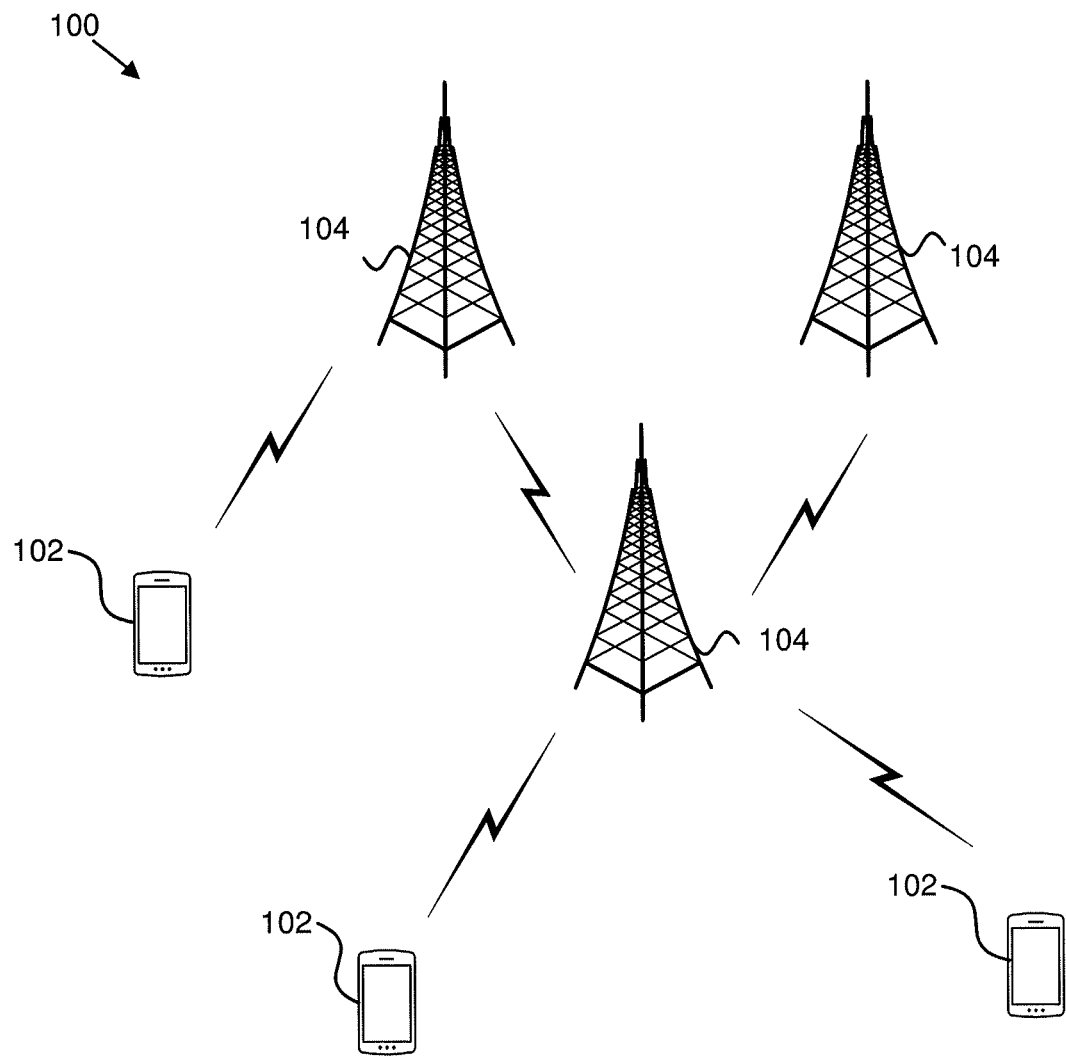
FIG. 1 is a schematic block diagram illustrating one embodiment of a wireless communication system for transmitting and/or receiving handover requests with network information.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for transmitting and/or receiving handover requests with network information. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base station, a Node-B, an eNB, a gNB, a Home Node-B, a RAN, a relay node, a device, a network device, an IAB node, a donor IAB node, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 5G or NG (Next Generation) of the 3GPP protocol, wherein the network unit 104 transmits using NG RAN technology. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a network unit 104 may transmit and/or receive handover requests with network information. In some embodiments, the network unit 104 may transmit a handover request to a target device. In these embodiments, the handover request includes: first information indicating that a source communication network corresponding to a source device is unable to support a predetermined quality of service; and second information corresponding to capacity of the source communication network. In these embodiments, the network unit 104 may receive a response to the handover request.

In various embodiments, a network unit 104 may transmit and/or receive handover requests with network information. In some embodiments, the network unit 104 may receive, at the network unit 104, a handover request from a source device. In such embodiments, the handover request includes: first information indicating that a source communication network corresponding to the source device is unable to support a predetermined quality of service; and second information corresponding to capacity of the source communication network. In these embodiments, the network unit 104 may transmit a response to the handover request. Accordingly, a network unit 104 may be used for transmitting and/or receiving handover requests with network information.

Figure 2:
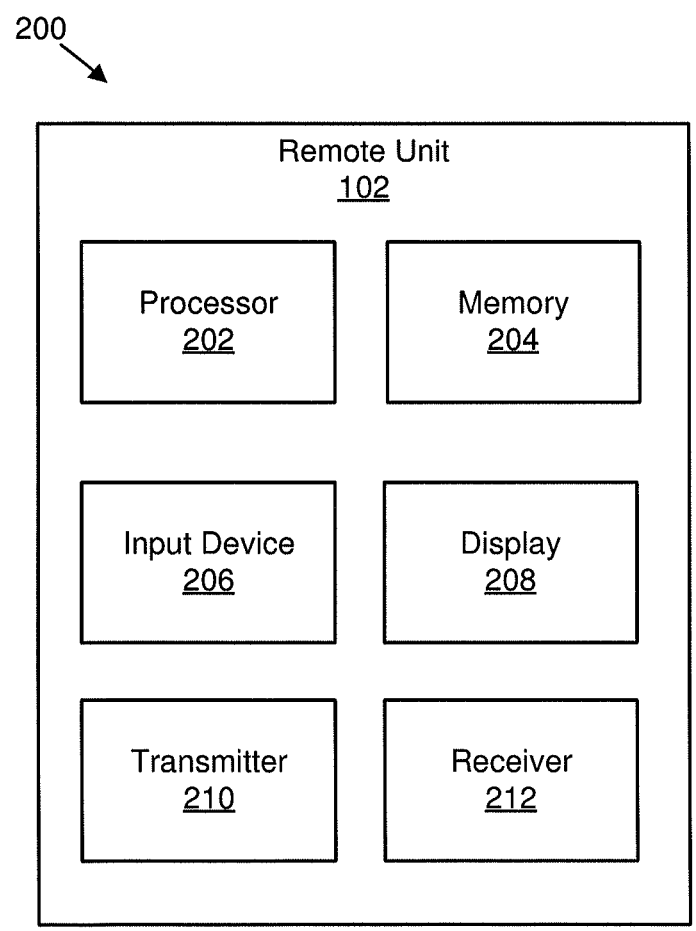
FIG. 2 is a schematic block diagram illustrating one embodiment of an apparatus that may be used for communication with a network.

FIG. 2 depicts one embodiment of an apparatus 200 that may be used for communication with a network. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
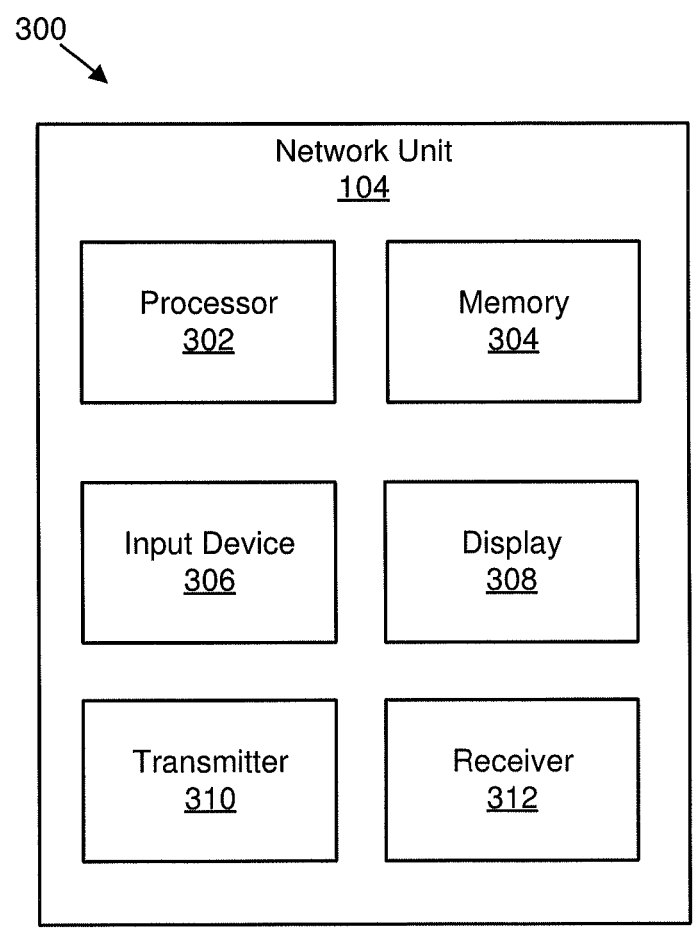
FIG. 3 is a schematic block diagram illustrating one embodiment of an apparatus that may be used for transmitting and/or receiving handover requests with network information.

FIG. 3 depicts one embodiment of an apparatus 300 that may be used for transmitting and/or receiving handover requests with network information. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In one embodiment, the transmitter 310 transmits a handover request to a target device. In such an embodiment, the handover request includes: first information indicating that a source communication network corresponding to a source device is unable to support a predetermined quality of service; and second information corresponding to capacity of the source communication network. In various embodiments, the receiver 312 receives a response to the handover request.

In some embodiments, the receiver 312 receives a handover request at the apparatus from a source device. In such embodiments, the handover request includes: first information indicating that a source communication network corresponding to the source device is unable to support a predetermined quality of service; and second information corresponding to capacity of the source communication network. In various embodiments, the transmitter 310 transmits a response to the handover request.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
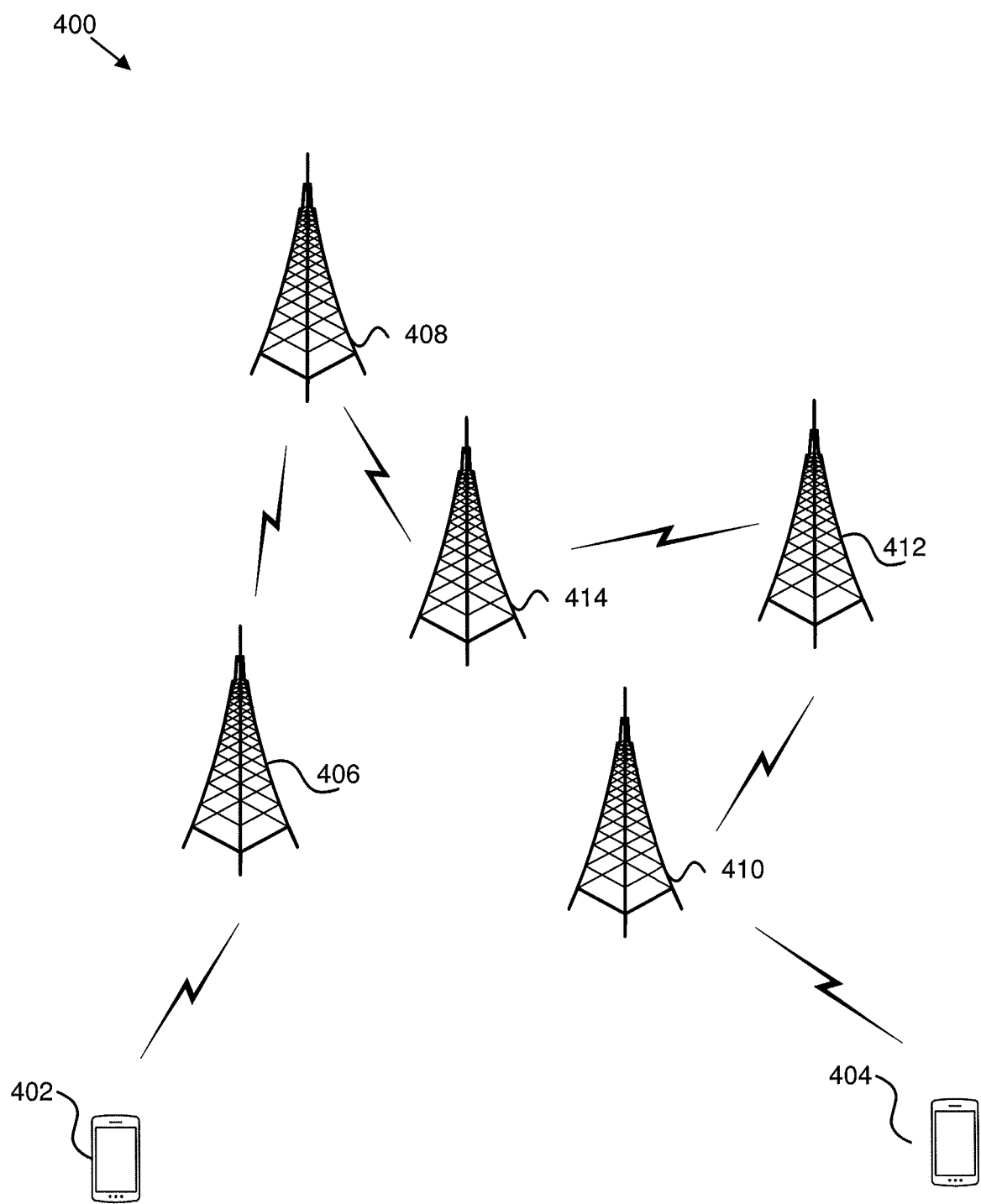
FIG. 4 is a schematic block diagram illustrating one embodiment of an integrated access backhaul system.

FIG. 4 is a schematic block diagram illustrating one embodiment of an integrated access backhaul ("IAB") system 400. The IAB system 400 includes a first UE 402, a second UE 404, a first IAB node 406, an IAB donor node 408, a second IAB node 410, a third IAB node 412, and a fourth IAB node 414. As illustrated, the first UE 402 is connected to the IAB donor node 408 via the first IAB node 406. Moreover, the second UE 404 is connected to the IAB donor node 408 via the second IAB node 410, the third IAB node 412, and the fourth IAB node 414. The IAB system 400, as illustrated, may be used for multi-hop backhauling via multiple IAB nodes.

As may be appreciated, multi-hop backhauling systems may provide a larger range extension than single hop systems. This may especially be beneficial for frequencies above 6 GHz due to a limited range of such frequencies. In some configurations, multi-hop backhauling enables backhauling around obstacles (e.g., buildings).

A maximum number of hops in a deployment may depend on many factors such as frequency, cell density, propagation environment, and traffic load. Thus, flexibility in hop count may be desirable. With an increased number of hops, scalability issues may arise, performance may be limited, and/or signaling load may increase signaling load to undesirable levels.

As may be appreciated, wireless backhaul links may be vulnerable to blockage (e.g., due to moving objects such as vehicles, due to seasonal changes (foliage), due to infrastructure changes (new buildings), and so forth). Such vulnerability may also apply to physically stationary IAB-nodes. In FIG. 4, the first UE 402 may switch from communicating via the first IAB node 406 to communicating with the second IAB node 410 if a backhaul link is blocked by objects (e.g., moving objects). Moreover, traffic variations may create uneven load distribution on wireless backhaul links leading to local link congestion and/or node congestion.

In some embodiments, an IAB node may include MT and DU functions. The MT function may be a component of a mobile equipment, or, as used herein, MT may be a function residing on an IAB node that terminates radio interface layers of a backhaul Uu interface toward the IAB-donor or other IAB nodes.

In various embodiments, a gNB may include a gNB-CU and one or more gNB-DUs. Moreover, a gNB-CU and a gNB-DU may be connected via an F1 interface. A gNB-CU may be a gNB central unit that is a logical node hosting RRC, SDAP, and PDCP protocols of the gNB. Furthermore, a gNB-DU may be a gNB distributed unit that is a logical node hosting RLC, MAC, and PHY layers of the gNB. In some embodiments, one cell is supported by only one gNB-DU.

In FIG. 4 the IAB nodes may be in a standalone mode which includes one IAB-donor and multiple IAB-nodes. The IAB-donor node 408 may be treated as a single logical node that includes a set of functions such as gNB-DU, gNB-CU-CP, gNB-CU-UP and potentially other functions. In certain embodiments, the IAB-donor node 408 may be split according to its functions which can all be either collocated or non-collocated as allowed by 3GPP NG-RAN architecture.

Figure 5:
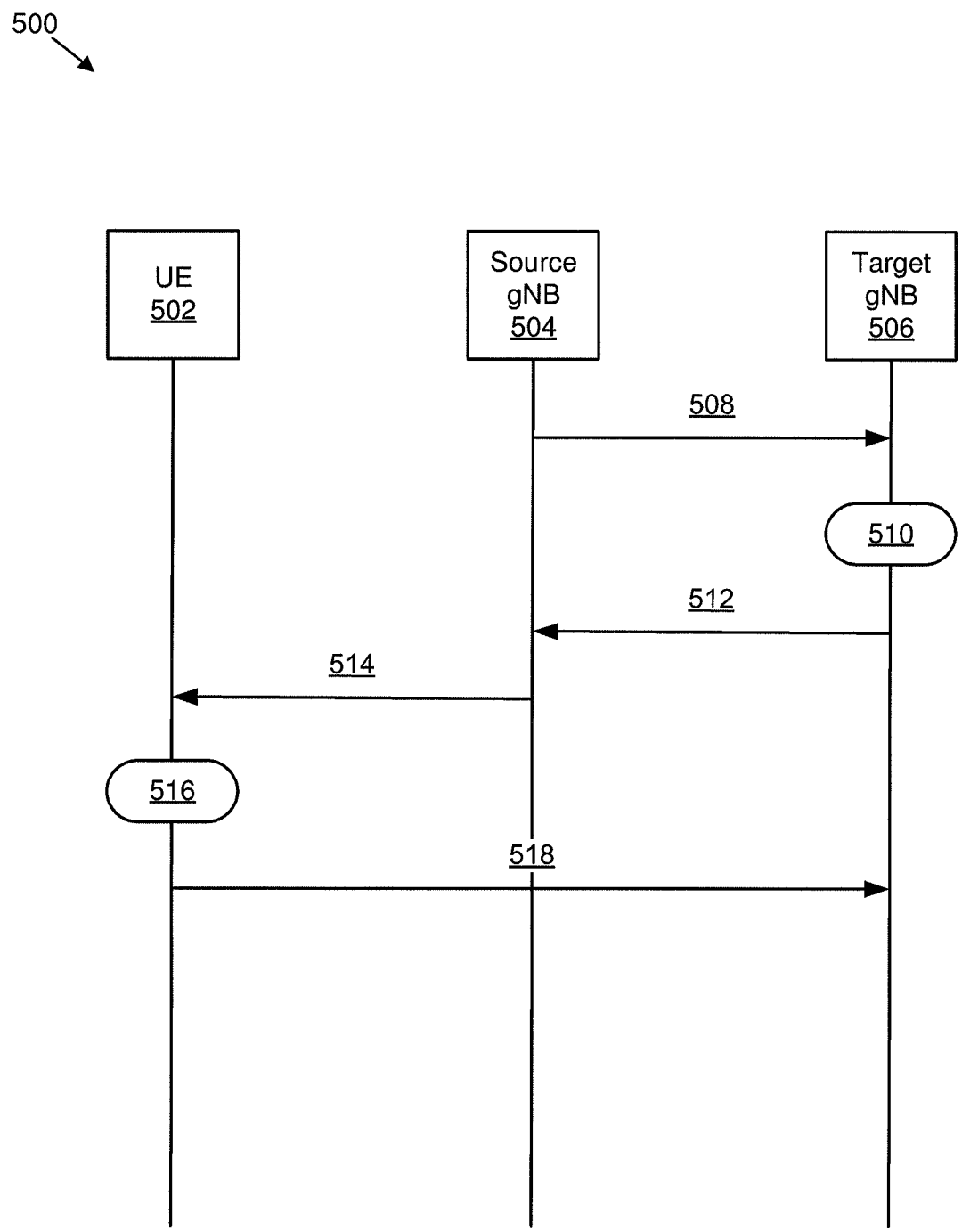
FIG. 5 is a schematic block diagram illustrating one embodiment of a handover procedure.

FIG. 5 is a schematic block diagram illustrating one embodiment of a handover procedure 500. A remote unit (UE 502), a source gNB 504, and a target gNB 506 communicate as part of the handover procedure 500. As may be appreciated, any of the communications described in this and other embodiments may include one or more messages as part of a communication.

The handover procedure 500 includes a first communication 508 transmitted from the source gNB 504 to the target gNB 506. The first communication 508 may include the source gNB 504 initiating handover and issuing a handover request, such as over an Xn interface (e.g., an inter-base station interface).

The target gNB 506 may perform admission control at step 510 and may provide an RRC configuration as part of a handover acknowledgement.

The handover procedure 500 includes a second communication 512 transmitted from the target gNB 506 to the source gNB 504. The second communication 512 may include the target gNB 506 transmitting the handover acknowledgement to the source gNB 504.

In a third communication 514 transmitted from the source gNB 504 to the UE 502, the source gNB 504 may provide the RRC configuration to the UE 502 in a handover command. A message having the handover command may also include at least a cell ID and all information (e.g., access information) required to access the target cell so that the UE 502 can access the target cell without reading system information. For some configurations, the information required for contention-based and contention-free random access may be included in the message having the handover command. Moreover, access information for the target cell may include beam specific information.

The UE 502 may move (e.g., reconfigure), at step 516, its RRC connection to the target gNB 506. Furthermore, in a fourth communication 518 transmitted from the UE 502 to the target gNB 506, the UE 502 may transmit a handover complete reply to the target gNB 506.

Figure 6:
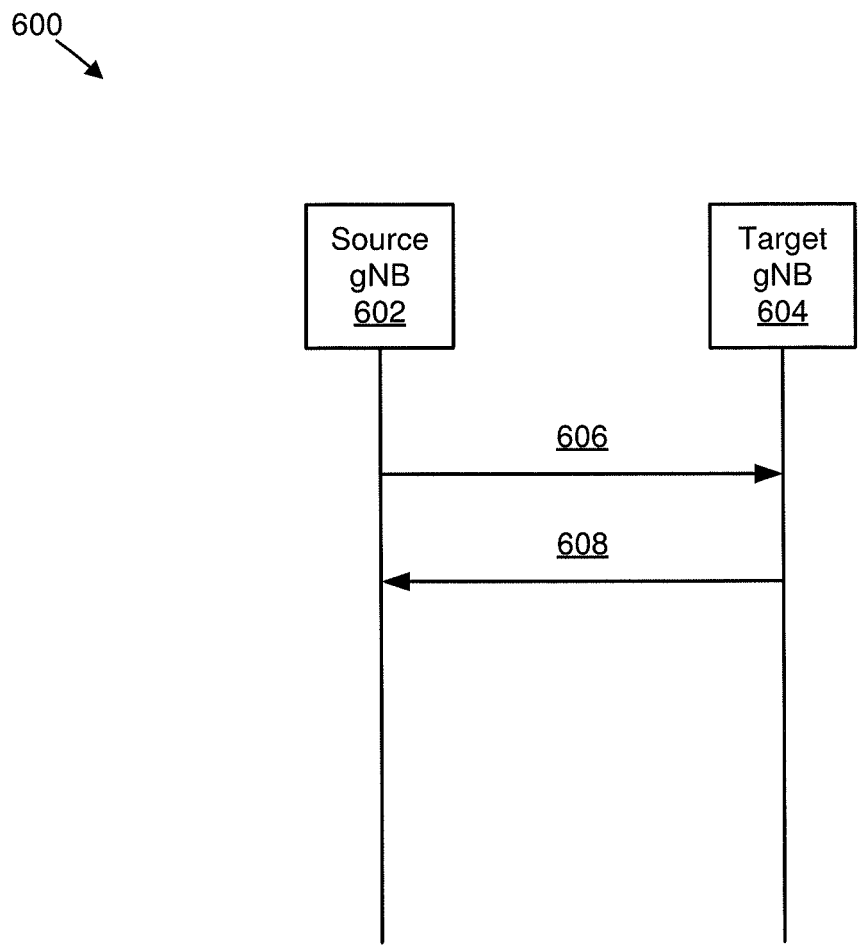
FIG. 6 is a schematic block diagram illustrating one embodiment of an unsuccessful handover procedure.

FIG. 6 is a schematic block diagram illustrating one embodiment of an unsuccessful handover procedure 600. A source gNB 602 and a target gNB 604 communicate as part of the unsuccessful handover procedure 600.

The unsuccessful handover procedure 600 includes a first communication 606 transmitted from the source gNB 602 to the target gNB 604. The first communication 606 may include a handover request.

If the target gNB 604 does not admit at least one PDU session resource, or a failure occurs during handover preparation, the target gNB 604, in a second communication 608, transmits a message including a handover preparation failure indication to the source gNB 602. The message may include a cause IE with an appropriate value. The handover preparation failure may inform the source gNB 602 that handover preparation has failed.

Figure 7:
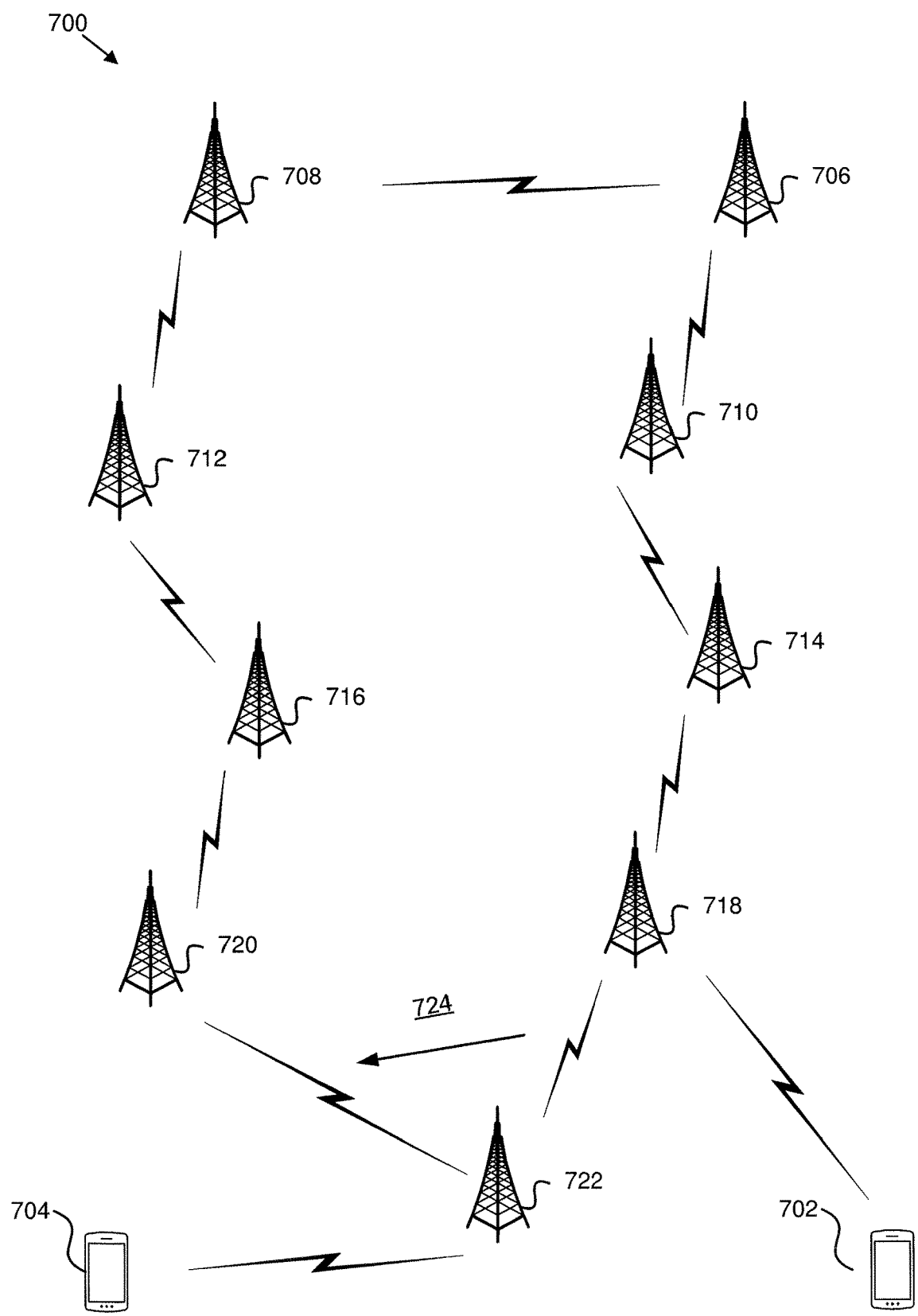
FIG. 7 is a schematic block diagram illustrating another embodiment of an integrated access backhaul system.

FIG. 7 is a schematic block diagram illustrating another embodiment of an integrated access backhaul system 700. The integrated access backhaul system 700 includes a first UE 702 ("UE1"), a second UE 704 ("UE2"), a first donor central unit 706 ("Donor CU1"), a second donor central unit 708 ("Donor CU2"), a first donor distributed unit 710 ("Donor DU1"), a second donor distributed unit 712 ("Donor DU2"), a first IAB node 714 ("IAB node1"), a second IAB node 716 ("IAB node2"), a third IAB node 718 ("IAB node3"), a fourth IAB node 720 ("IAB node4"), and a fifth IAB node 722 ("IAB node5"). As illustrated, the fifth IAB node 722 accesses the first donor central unit 706 by connecting to the third IAB node 718. However, the first donor central unit 706 may send information that triggers the fifth IAB node 722 to move to the second donor central unit 708 based on information such as Uu channel quality and/or loading, as illustrated by arrow 724. Thus, the third IAB node 718 may be a source IAB node, and the fourth IAB node 720 may be a target IAB node for upstream communication from the fifth IAB node 722.

Figure 8:
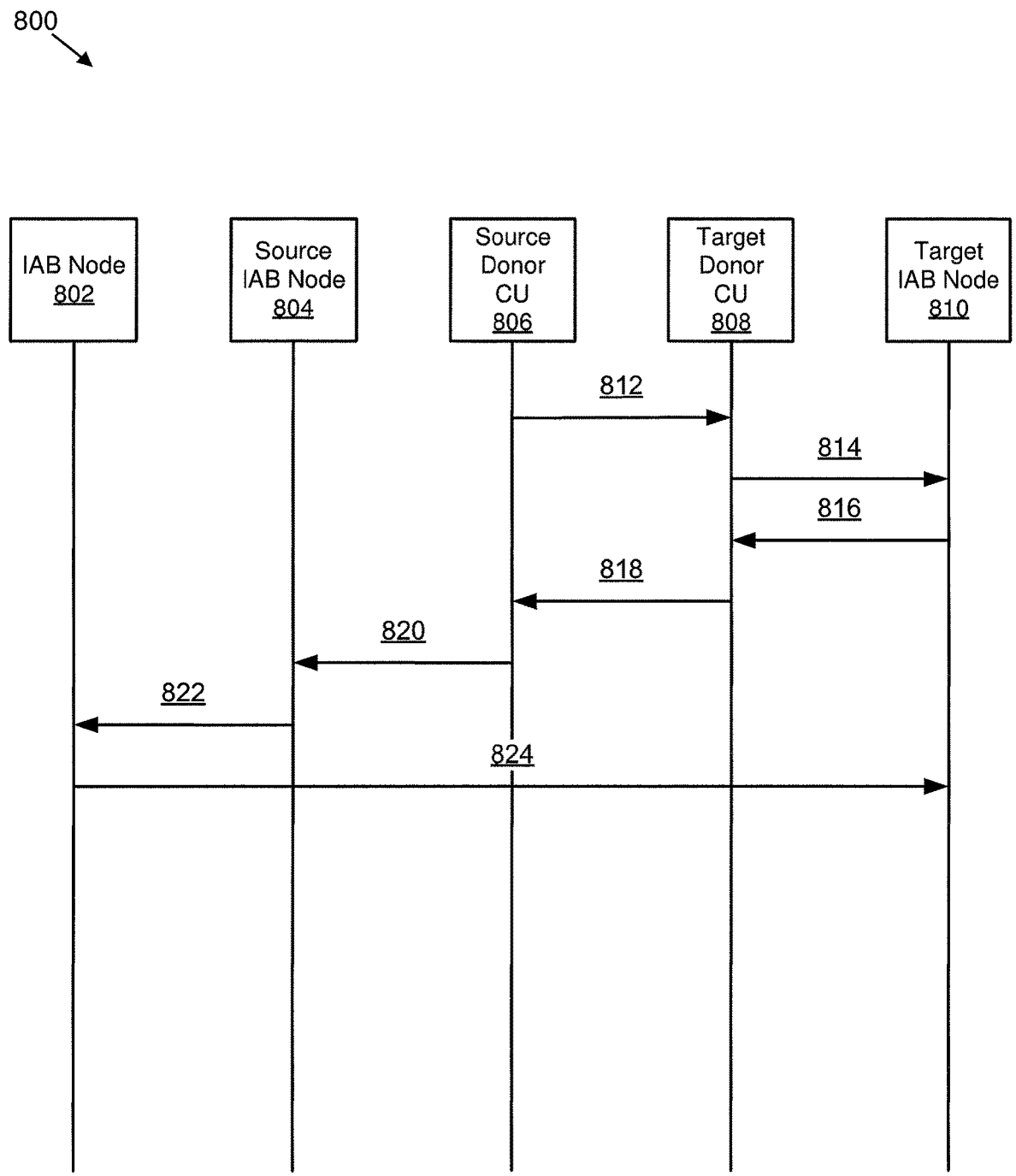
FIG. 8 is a schematic block diagram illustrating another embodiment of a handover procedure.

FIG. 8 is a schematic block diagram illustrating another embodiment of a handover procedure 800. An IAB node 802, a source IAB node 804, a source donor CU 806, a target donor CU 808, and a target IAB node 810 communicate as part of the handover procedure 800. The handover procedure 800 provides one embodiment of communications that may be used to transition communication from the IAB node 802 (e.g., fifth IAB node 722) communicating with the source IAB node 804 (e.g., third IAB node 718) to the target IAB node 810 (e.g., fourth IAB node 720).

In one embodiment, in a first communication 812 transmitted from the source donor CU 806 to the target donor CU 808, the source donor CU 806 may initiate handover and may transmit a handover request over an Xn interface (e.g., an inter-base station interface) to the target donor CU 808. In some embodiments, a new cause IE may be added to the handover request to indicate that a current backhaul link (e.g., source backhaul link corresponding to the source IAB node 804) cannot meet QoS requirements. In certain embodiments, the QoS requirement corresponds to a type of communication service (e.g., URLLC, MTC, eMBB, etc.). In various embodiments, the new cause IE may indicate "QoS not supported for backhaul link reason," "latency not supported for backhaul link reason," "bit rate not supported for backhaul link reason," "deterioration of backhaul link quality," and/or other reasons. In one embodiment, the handover request may include IAB related information (e.g., corresponding to the source IAB node 804). In some embodiments, the IAB related information may include an uplink IAB aggregated maximum bit rate and/or a downlink IAB aggregated maximum bit rate. An aggregated maximum bit rate may include a combination of bit rates for all uplink and/or downlink devices that communicate with a particular IAB node (e.g., the source IAB node 804). In various embodiments, the IAB related information may include a number of UEs served by a particular IAB node (e.g., the source IAB node 804) and/or a number of downstream IAB nodes corresponding to the particular IAB node.

In certain embodiments, in a second communication 814 transmitted from the target donor CU 808 to the target IAB node 810, the target donor CU 808 may send a UE context setup request message to the target IAB node 810 to create a UE context and setup one or more bearers.

In some embodiments, in a third communication 816 transmitted from the target IAB node 810 to the target donor CU 808, the target IAB node 810 may respond to the target donor CU 808 with a UE context setup response message.

In various embodiments, in a fourth communication 818 transmitted from the target donor CU 808 to the source donor CU 806, the target donor CU 808 may perform admission control and may provide an RRC configuration as part of a handover acknowledgement to the source donor CU 806.

In one embodiment, in a fifth communication 820 transmitted from the source donor CU 806 to the source IAB node 804, the source donor CU 806 may send a UE context modification request message to the source IAB node 804 which includes a generated RRCConnectionReconfiguration message for the IAB node 802.

In certain embodiments, in a sixth communication 822 transmitted from the source IAB node 804 to the IAB node 802, the source IAB node 804 may provide the RRC configuration to the IAB node 802 in a handover command message. The handover command message may include at least a cell ID (e.g., target IAB node 810 ID) and all information required to access the target IAB node 810.

In some embodiments, in a seventh communication 824 transmitted from the IAB node 802 to the target IAB node 810, the IAB node 802 may move its RRC connection to the target IAB node 810 and send a reply to the IAB node 810 having a handover complete message indicating that handover is complete.

Figure 9:
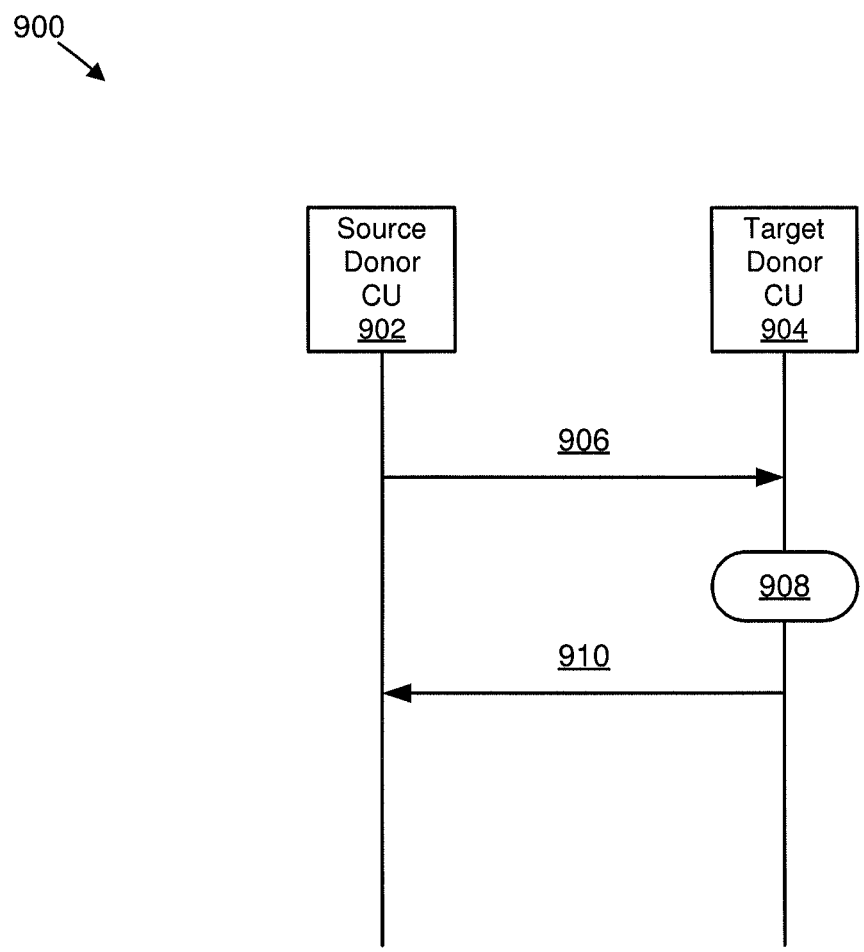
FIG. 9 is a schematic block diagram illustrating another embodiment of an unsuccessful handover procedure.

FIG. 9 is a schematic block diagram illustrating another embodiment of an unsuccessful handover procedure 900. A source donor CU 902 and a target donor CU 904 communicate as part of the unsuccessful handover procedure 900.

In one embodiment, in a first communication 906 transmitted from the source donor CU 902 to the target donor CU 904, the source donor CU 902 may initiate handover and may transmit a handover request message over an Xn interface (e.g., an inter-base station interface) to the target donor CU 904.

The target donor CU 904 may perform 908 admission control and may determine that the handover request is to be denied.

In certain embodiments, in a second communication 910 from the target donor CU 904 to the source donor CU 902, the target donor CU 904 may transmit a handover preparation failure indication that includes a cause (e.g., a cause IE) to the source donor CU 902. In various embodiments, the cause may indicate that the handover request is denied because a handover may cause a backhaul link overload at a communication network of the target donor CU 904, the backhaul link of the communication network of the target donor CU 904 has limited capacity, and/or other reasons.

Figure 10:
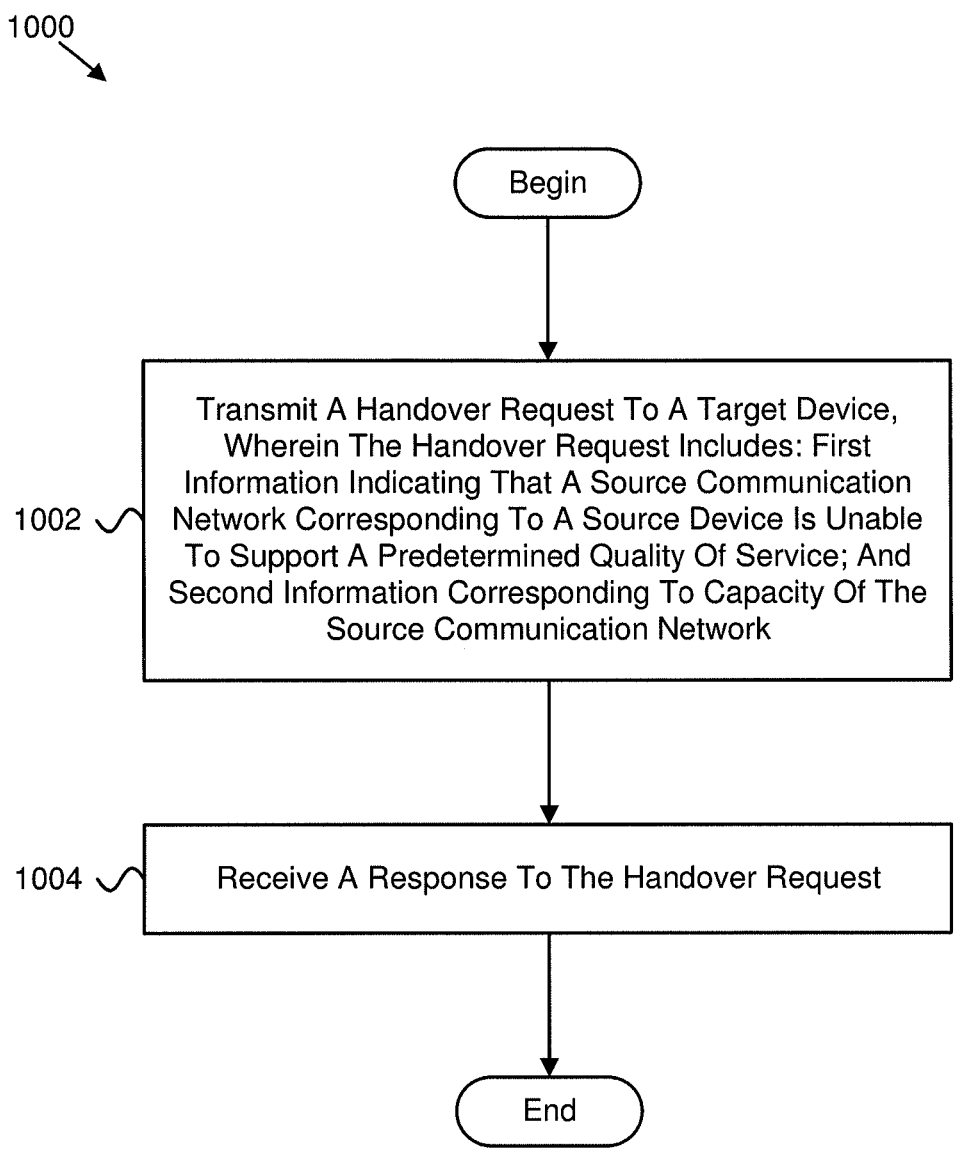
FIG. 10 is a schematic flow chart diagram illustrating one embodiment of a method for transmitting handover requests with network information.

FIG. 10 is a schematic flow chart diagram illustrating one embodiment of a method 1000 for transmitting handover requests with network information. In some embodiments, the method 1000 is performed by an apparatus, such as the network unit 104 (e.g., IAB node). In certain embodiments, the method 1000 may be performed by a processor executing program code, for example, a microcontroller, a microprocessor, a CPU, a GPU, an auxiliary processing unit, a FPGA, or the like.

The method 1000 may include transmitting 1002 a handover request to a target device. In such an embodiment, the handover request includes: first information indicating that a source communication network corresponding to a source device is unable to support a predetermined quality of service; and second information corresponding to capacity of the source communication network. In certain embodiments, the method 1000 includes receiving 1004 a response to the handover request.

In certain embodiments, the target device comprises a target central unit, a target integrated access backhaul node, or a combination thereof. In some embodiments, the source communication network comprises a source backhaul link. In various embodiments, the source device comprises a source central unit, a source integrated access backhaul node, or a combination thereof.

In one embodiment, the predetermined quality of service corresponds to a type of communication service. In certain embodiments, the predetermined quality of service comprises a latency, a bit rate, a deterioration level, or some combination thereof. In some embodiments, the first information is included in a cause IE (information element) comprising a latency problem of a backhaul link, a bit rate problem of the backhaul link, a deterioration of the backhaul link, or some combination thereof.

In various embodiments, the second information comprises a maximum aggregated bit rate, a number of user devices served by the source device, or some combination thereof. In one embodiment, the response to the handover request comprises a handover failure message. In certain embodiments, the handover failure message indicates that a target communication network is unable to support the predetermined quality of service.

In some embodiments, the handover failure message indicates an overload of the target communication network. In various embodiments, the indication of the overload of the target communication network is included in a cause information element. In one embodiment, the handover failure message indicates a limited capacity of the target communication network.

In certain embodiments, the indication of the limited capacity of the target communication network is included in a cause information element. In some embodiments, the target communication network comprises a target backhaul link.

Figure 11:
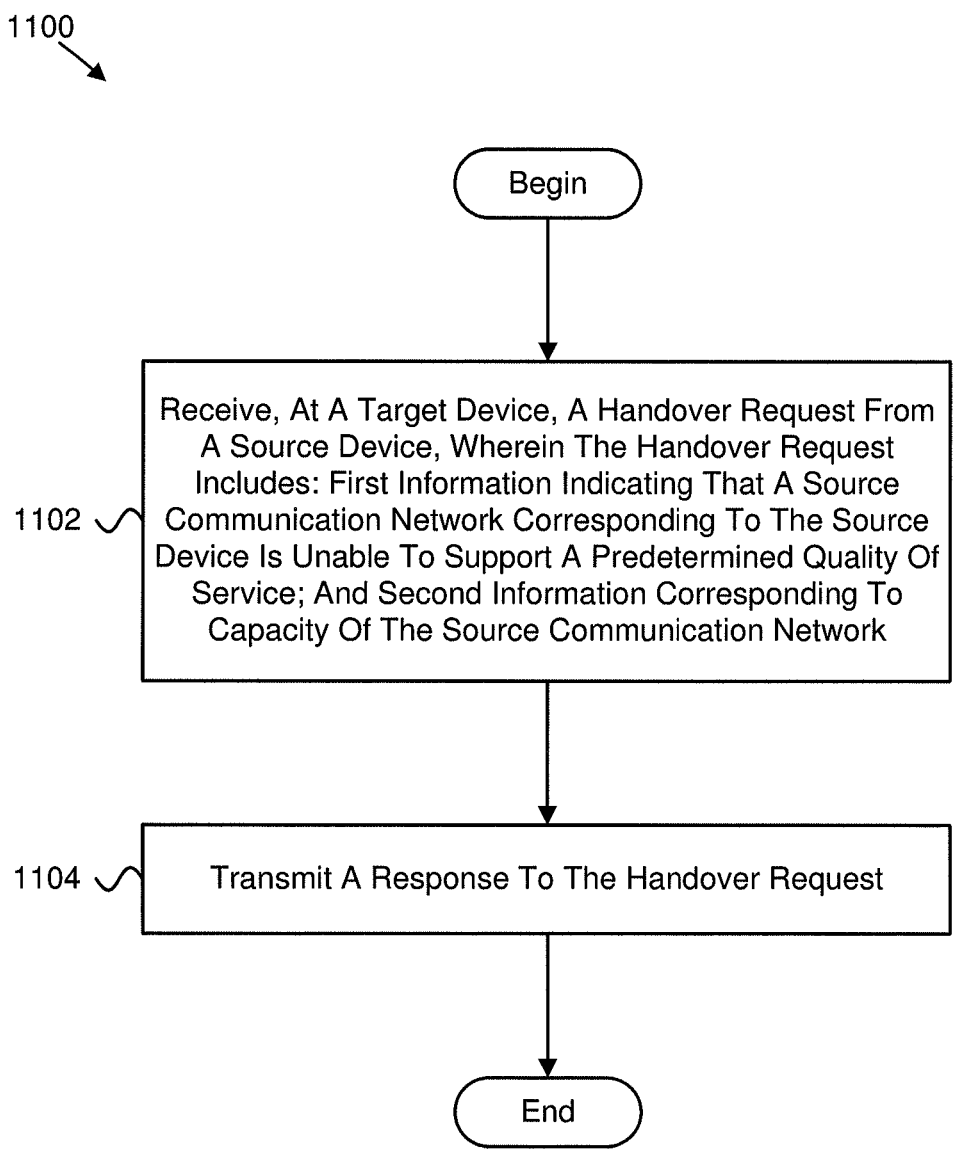
FIG. 11 is a schematic flow chart diagram illustrating one embodiment of a method for receiving handover requests with network information.

FIG. 11 is a schematic flow chart diagram illustrating one embodiment of a method 1100 for receiving handover requests with network information. In some embodiments, the method 1100 is performed by an apparatus, such as the network unit 104 (e.g., IAB node). In certain embodiments, the method 1100 may be performed by a processor executing program code, for example, a microcontroller, a microprocessor, a CPU, a GPU, an auxiliary processing unit, a FPGA, or the like.

The method 1100 may include receiving 1102, at a target device, a handover request from a source device. In such embodiments, the handover request includes: first information indicating that a source communication network corresponding to the source device is unable to support a predetermined quality of service; and second information corresponding to capacity of the source communication network. In some embodiments, the method 1100 includes transmitting 1104 a response to the handover request.

In certain embodiments, the target device comprises a target central unit, a target integrated access backhaul node, or a combination thereof. In some embodiments, the source communication network comprises a source backhaul link. In various embodiments, the source device comprises a source central unit, a source integrated access backhaul node, or a combination thereof.

In one embodiment, the predetermined quality of service corresponds to a type of communication service. In certain embodiments, the predetermined quality of service comprises a latency, a bit rate, a deterioration level, or some combination thereof. In some embodiments, the first information is included in a cause information element comprising a latency problem of a backhaul link, a bit rate problem of the backhaul link, a deterioration of the backhaul link, or some combination thereof.

In various embodiments, the second information comprises a maximum aggregated bit rate, a number of user devices served by the source device, or some combination thereof. In one embodiment, the response to the handover request comprises a handover failure message. In certain embodiments, the handover failure message indicates that a target communication network is unable to support the predetermined quality of service.

In some embodiments, the handover failure message indicates an overload of the target communication network. In various embodiments, the indication of the overload of the target communication network is included in a cause information element. In one embodiment, the handover failure message indicates a limited capacity of the target communication network.

In certain embodiments, the indication of the limited capacity of the target communication network is included in a cause information element. In some embodiments, the target communication network comprises a target backhaul link.

In one embodiment, a method comprises: transmitting a handover request to a target device, wherein the handover request comprises: first information indicating that a source communication network corresponding to a source device is unable to support a predetermined quality of service; and second information corresponding to capacity of the source communication network; and receiving a response to the handover request.

In certain embodiments, the target device comprises a target central unit, a target integrated access backhaul node, or a combination thereof.

In some embodiments, the source communication network comprises a source backhaul link.

In various embodiments, the source device comprises a source central unit, a source integrated access backhaul node, or a combination thereof.

In one embodiment, the predetermined quality of service corresponds to a type of communication service.

In certain embodiments, the predetermined quality of service comprises a latency, a bit rate, a deterioration level, or some combination thereof.

In some embodiments, the first information is included in a cause information element comprising a latency problem of a backhaul link, a bit rate problem of the backhaul link, a deterioration of the backhaul link, or some combination thereof.

In various embodiments, the second information comprises a maximum aggregated bit rate, a number of user devices served by the source device, or some combination thereof.

In one embodiment, the response to the handover request comprises a handover failure message.

In certain embodiments, the handover failure message indicates that a target communication network is unable to support the predetermined quality of service.

In some embodiments, the handover failure message indicates an overload of the target communication network.

In various embodiments, the indication of the overload of the target communication network is included in a cause information element.

In one embodiment, the handover failure message indicates a limited capacity of the target communication network.

In certain embodiments, the indication of the limited capacity of the target communication network is included in a cause information element.

In some embodiments, the target communication network comprises a target backhaul link.

In one embodiment, an apparatus comprises: a transmitter that transmits a handover request to a target device, wherein the handover request comprises: first information indicating that a source communication network corresponding to a source device is unable to support a predetermined quality of service; and second information corresponding to capacity of the source communication network; and a receiver that receives a response to the handover request.

In certain embodiments, the target device comprises a target central unit, a target integrated access backhaul node, or a combination thereof.

In some embodiments, the source communication network comprises a source backhaul link.

In various embodiments, the source device comprises a source central unit, a source integrated access backhaul node, or a combination thereof.

In one embodiment, the predetermined quality of service corresponds to a type of communication service.

In certain embodiments, the predetermined quality of service comprises a latency, a bit rate, a deterioration level, or some combination thereof.

In some embodiments, the first information is included in a cause information element comprising a latency problem of a backhaul link, a bit rate problem of the backhaul link, a deterioration of the backhaul link, or some combination thereof.

In various embodiments, the second information comprises a maximum aggregated bit rate, a number of user devices served by the source device, or some combination thereof.

In one embodiment, the response to the handover request comprises a handover failure message.

In certain embodiments, the handover failure message indicates that a target communication network is unable to support the predetermined quality of service.

In some embodiments, the handover failure message indicates an overload of the target communication network.

In various embodiments, the indication of the overload of the target communication network is included in a cause information element.

In one embodiment, the handover failure message indicates a limited capacity of the target communication network.

In certain embodiments, the indication of the limited capacity of the target communication network is included in a cause information element.

In some embodiments, the target communication network comprises a target backhaul link.

In one embodiment, a method comprises: receiving, at a target device, a handover request from a source device, wherein the handover request comprises: first information indicating that a source communication network corresponding to the source device is unable to support a predetermined quality of service; and second information corresponding to capacity of the source communication network; and transmitting a response to the handover request.

In certain embodiments, the target device comprises a target central unit, a target integrated access backhaul node, or a combination thereof.

In some embodiments, the source communication network comprises a source backhaul link.

In various embodiments, the source device comprises a source central unit, a source integrated access backhaul node, or a combination thereof.

In one embodiment, the predetermined quality of service corresponds to a type of communication service.

In certain embodiments, the predetermined quality of service comprises a latency, a bit rate, a deterioration level, or some combination thereof.

In some embodiments, the first information is included in a cause information element comprising a latency problem of a backhaul link, a bit rate problem of the backhaul link, a deterioration of the backhaul link, or some combination thereof.

In various embodiments, the second information comprises a maximum aggregated bit rate, a number of user devices served by the source device, or some combination thereof.

In one embodiment, the response to the handover request comprises a handover failure message.

In certain embodiments, the handover failure message indicates that a target communication network is unable to support the predetermined quality of service.

In some embodiments, the handover failure message indicates an overload of the target communication network.

In various embodiments, the indication of the overload of the target communication network is included in a cause information element.

In one embodiment, the handover failure message indicates a limited capacity of the target communication network.

In certain embodiments, the indication of the limited capacity of the target communication network is included in a cause information element.

In some embodiments, the target communication network comprises a target backhaul link.

In one embodiment, an apparatus comprises: a receiver that receives, at the apparatus, a handover request from a source device, wherein the handover request comprises: first information indicating that a source communication network corresponding to the source device is unable to support a predetermined quality of service; and second information corresponding to capacity of the source communication network; and a transmitter that transmits a response to the handover request.

In certain embodiments, the apparatus comprises a target device, a target central unit, a target integrated access backhaul node, or some combination thereof.

In some embodiments, the source communication network comprises a source backhaul link.

In various embodiments, the source device comprises a source central unit, a source integrated access backhaul node, or a combination thereof.

In one embodiment, the predetermined quality of service corresponds to a type of communication service.

In certain embodiments, the predetermined quality of service comprises a latency, a bit rate, a deterioration level, or some combination thereof.

In some embodiments, the first information is included in a cause information element comprising a latency problem of a backhaul link, a bit rate problem of the backhaul link, a deterioration of the backhaul link, or some combination thereof.

In various embodiments, the second information comprises a maximum aggregated bit rate, a number of user devices served by the source device, or some combination thereof.

In one embodiment, the response to the handover request comprises a handover failure message.

In certain embodiments, the handover failure message indicates that a target communication network is unable to support the predetermined quality of service.

In some embodiments, the handover failure message indicates an overload of the target communication network.

In various embodiments, the indication of the overload of the target communication network is included in a cause information element.

In one embodiment, the handover failure message indicates a limited capacity of the target communication network.

In certain embodiments, the indication of the limited capacity of the target communication network is included in a cause information element.

In some embodiments, the target communication network comprises a target backhaul link.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
 transmitting a handover request to a target device, wherein the handover request comprises:
  first information indicating that a source communication network corresponding to a source device is unable to support a predetermined quality of service; and
  second information corresponding to capacity of the source communication network; and
 receiving a response to the handover request.

2. The method of claim 1, wherein the target device comprises a target central unit, a target integrated access backhaul node, or a combination thereof.

3. The method of claim 1, wherein the source communication network comprises a source backhaul link.

4. The method of claim 1, wherein the source device comprises a source central unit, a source integrated access backhaul node, or a combination thereof.

5. The method of claim 1, wherein the predetermined quality of service corresponds to a type of communication service.

6. The method of claim 1, wherein the predetermined quality of service comprises a latency, a bit rate, a deterioration level, or some combination thereof.

7. The method of claim 1, wherein the first information is included in a cause information element comprising a latency problem of a backhaul link, a bit rate problem of the backhaul link, a deterioration of the backhaul link, or some combination thereof.

8. The method of claim 1, wherein the second information comprises a maximum aggregated bit rate, a number of user devices served by the source device, or some combination thereof.

9. The method of claim 1, wherein the response to the handover request comprises a handover failure message.

10. The method of claim 9, wherein the handover failure message indicates that a target communication network is unable to support the predetermined quality of service.

11. The method of claim 10, wherein the handover failure message indicates an overload of the target communication network.

12. The method of claim 11, wherein the indication of the overload of the target communication network is included in a cause information element.

13. The method of claim 10, wherein the handover failure message indicates a limited capacity of the target communication network.

14. The method of claim 13, wherein the indication of the limited capacity of the target communication network is included in a cause information element.

15. The method of claim 10, wherein the target communication network comprises a target backhaul link.

16. An apparatus comprising:
 a transmitter that transmits a handover request to a target device, wherein the handover request comprises:
  first information indicating that a source communication network corresponding to a source device is unable to support a predetermined quality of service; and
  second information corresponding to capacity of the source communication network; and
 a receiver that receives a response to the handover request.

17. A method comprising:
 receiving, at a target device, a handover request from a source device, wherein the handover request comprises:
  first information indicating that a source communication network corresponding to the source device is unable to support a predetermined quality of service; and
  second information corresponding to capacity of the source communication network; and
 transmitting a response to the handover request.

18. The method of claim 17, wherein the target device comprises a target central unit, a target integrated access backhaul node, or a combination thereof.

19. The method of claim 17, wherein the source communication network comprises a source backhaul link.

20. The method of claim 17, wherein the source device comprises a source central unit, a source integrated access backhaul node, or a combination thereof.

* * * * *